Figure 19:
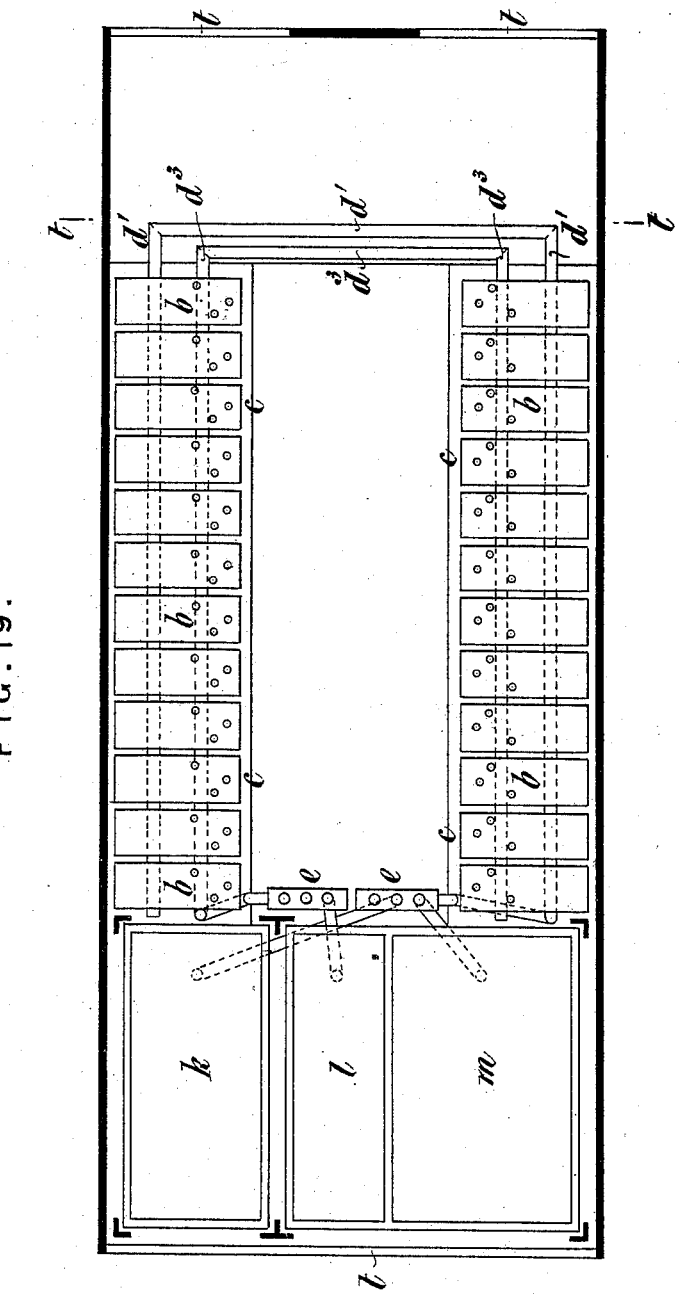

(No Model.) 10 Sheets—Sheet 1.
J. T. ARMSTRONG.
CONSTRUCTION OF STATIONARY AND ITINERANT ELECTRICAL BATTERIES.
No. 380,971. Patented Apr. 10, 1888.
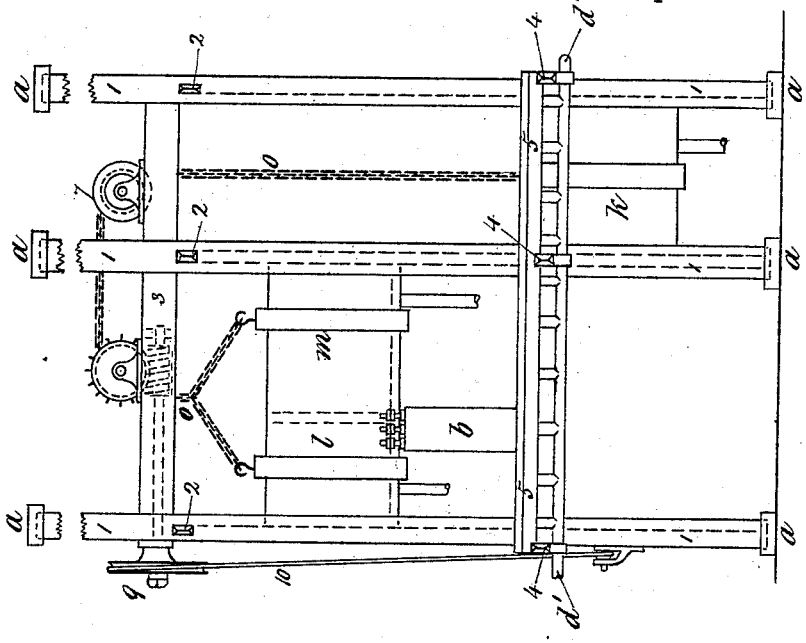
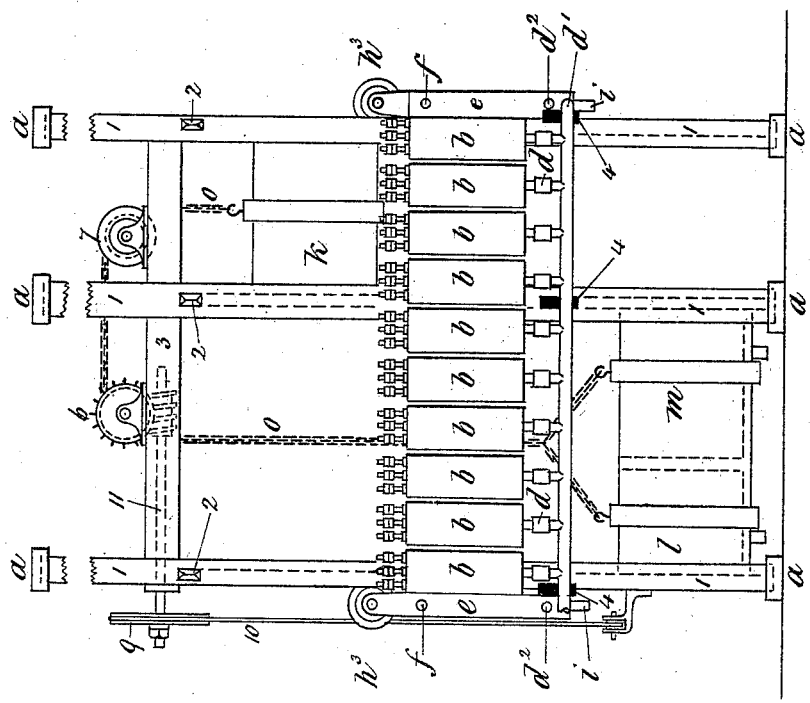
Witnesses.
Geo. W. Rea.
Robert Everett.
Inventor
James T. Armstrong,
By James L. Norris.
Atty.

(No Model.) 10 Sheets—Sheet 2.
J. T. ARMSTRONG.
CONSTRUCTION OF STATIONARY AND ITINERANT ELECTRICAL BATTERIES.
No. 380,971. Patented Apr. 10, 1888.
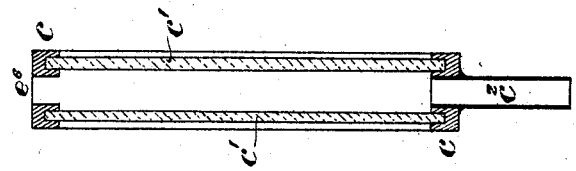
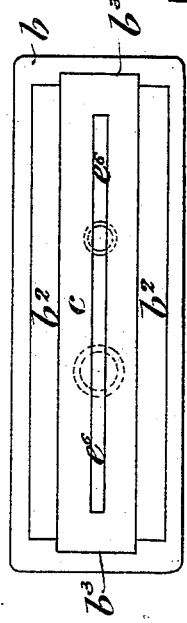
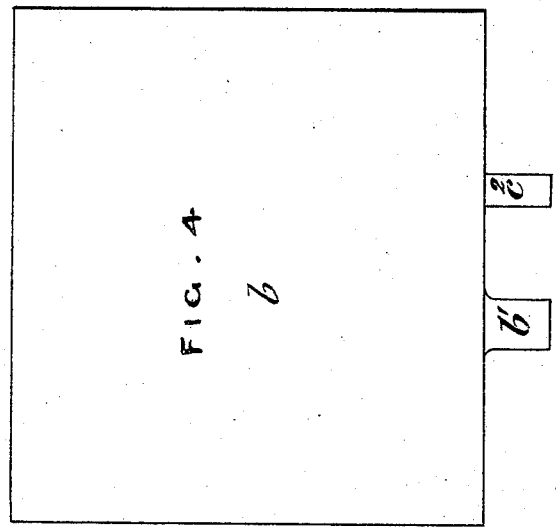
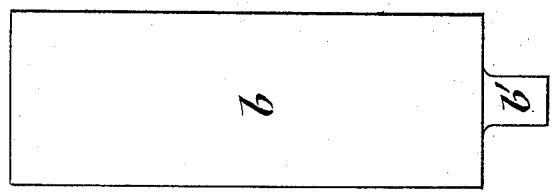
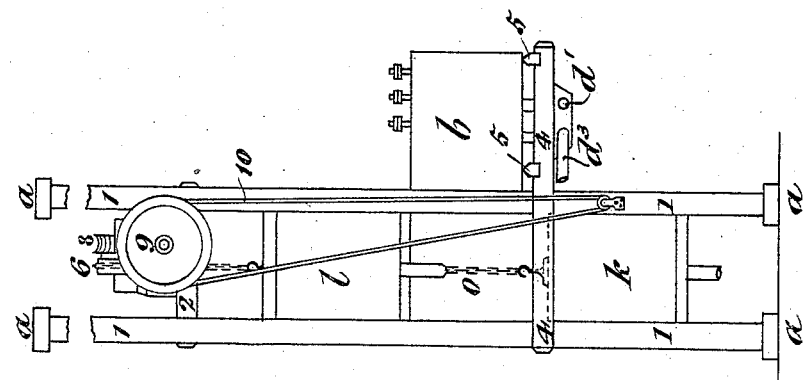
Witnesses,
Geo. W. Rea.
Robert Everett.
Inventor
James T. Armstrong.
By James L. Norris
Atty.

(No Model.) 10 Sheets—Sheet 3.
J. T. ARMSTRONG.
CONSTRUCTION OF STATIONARY AND ITINERANT ELECTRICAL BATTERIES.
No. 380,971. Patented Apr. 10, 1888.
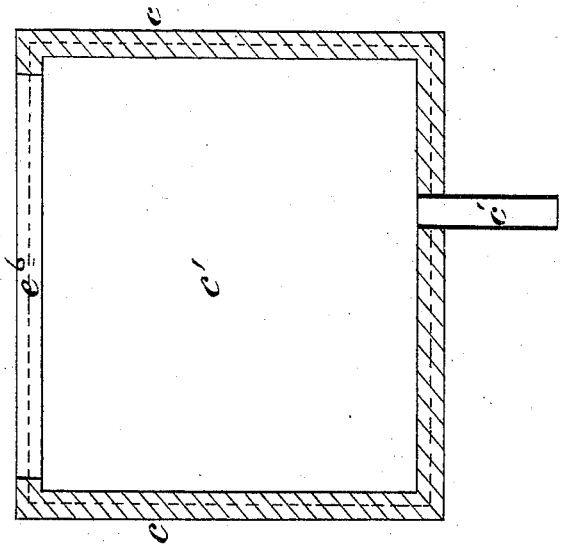
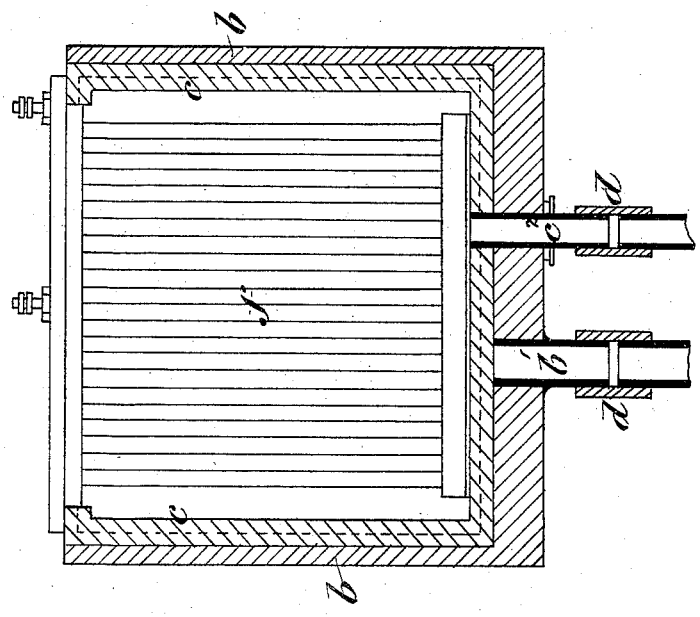

(No Model.) 10 Sheets—Sheet 4.
J. T. ARMSTRONG.
CONSTRUCTION OF STATIONARY AND ITINERANT ELECTRICAL BATTERIES.
No. 380,971. Patented Apr. 10, 1888.
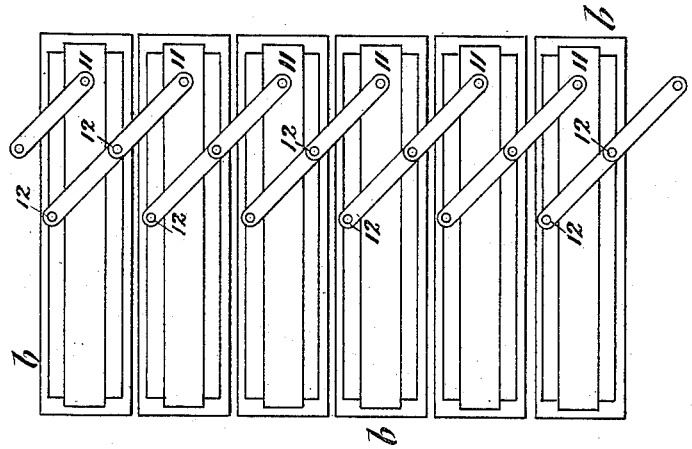
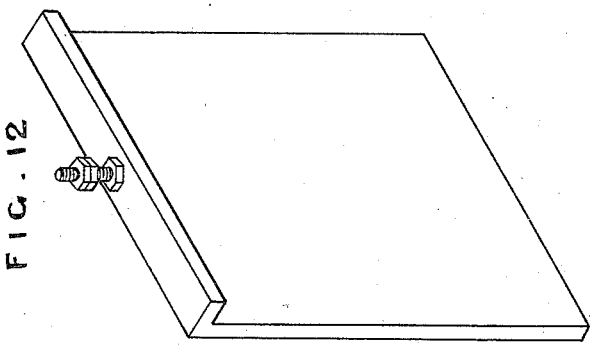
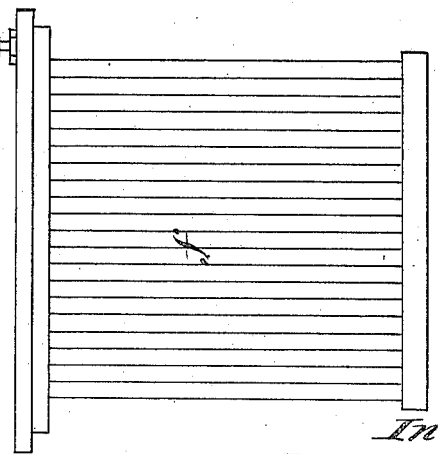
Witnesses.
Geo. W. Rea.
Robert Everett.
Inventor
James T. Armstrong.
By James L. Norris.
Atty.
N. PETERS, Photo-Lithographer, Washington, D. C.

(No Model.) 10 Sheets—Sheet 5.
J. T. ARMSTRONG.
CONSTRUCTION OF STATIONARY AND ITINERANT ELECTRICAL BATTERIES.
No. 380,971. Patented Apr. 10, 1888.
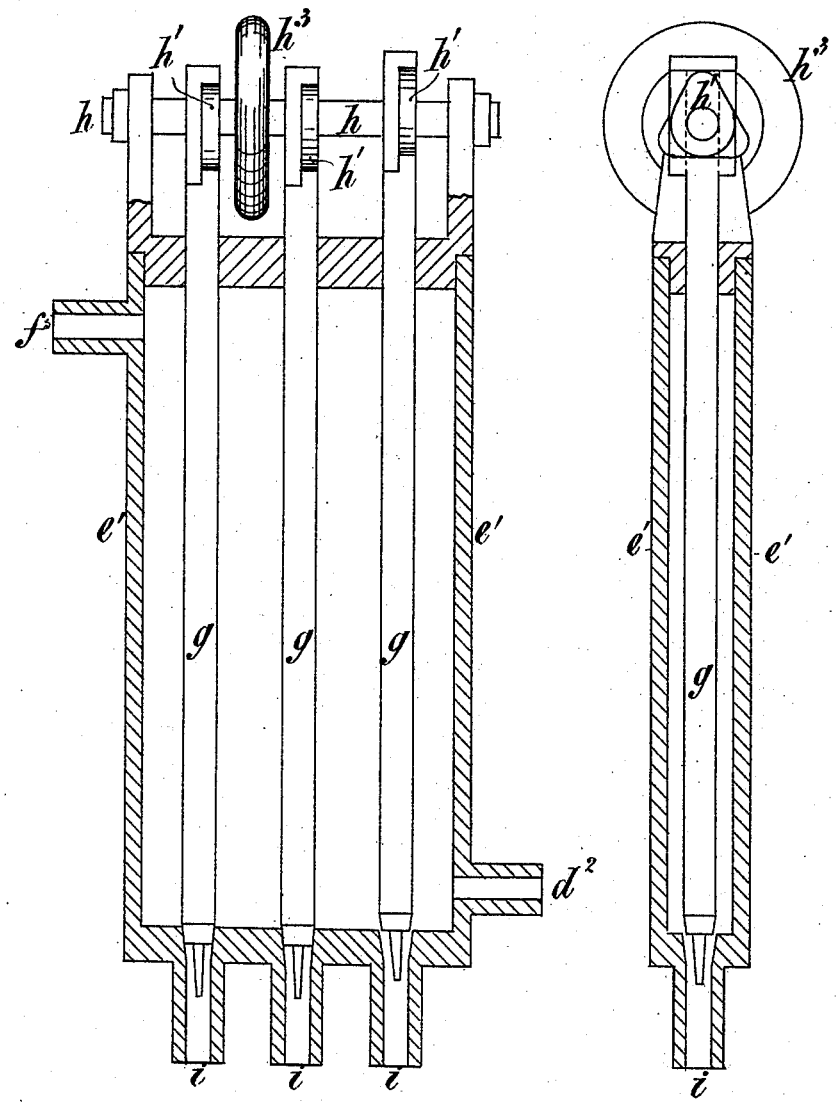

(No Model.) 10 Sheets—Sheet 6.
J. T. ARMSTRONG.
CONSTRUCTION OF STATIONARY AND ITINERANT ELECTRICAL BATTERIES.
No. 380,971. Patented Apr. 10, 1888.
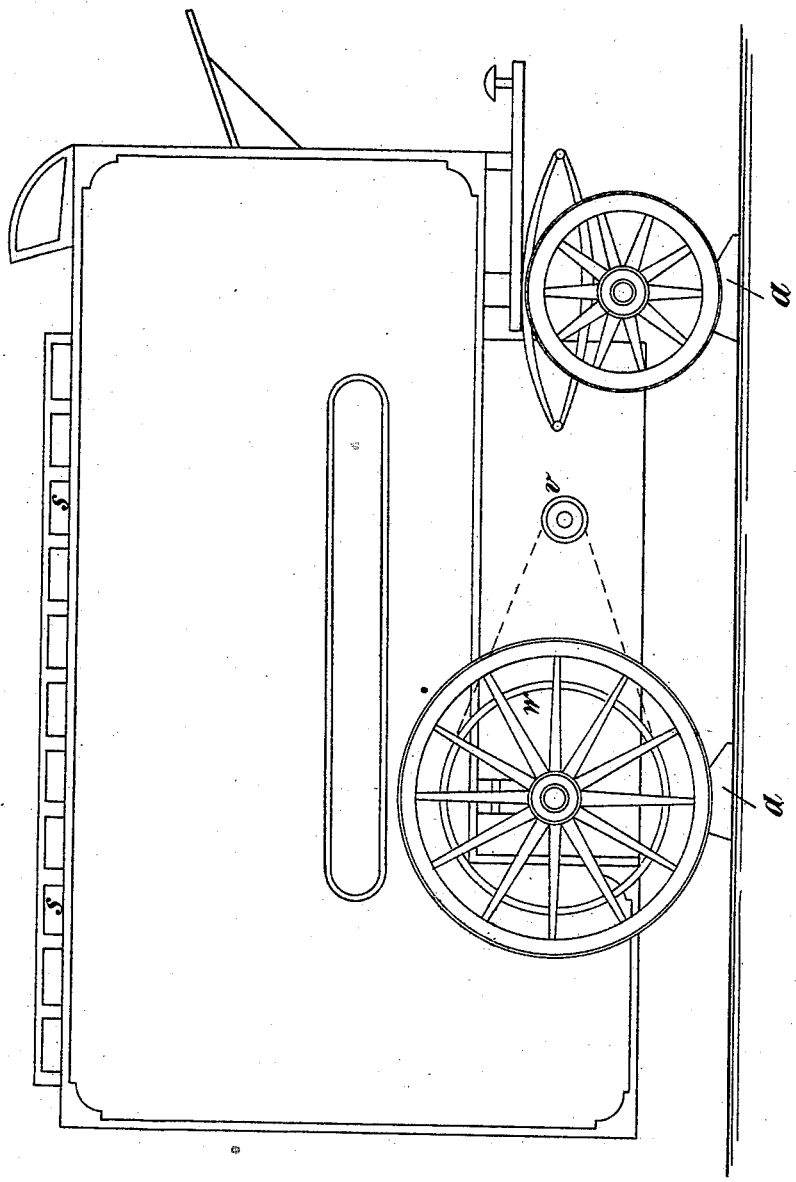

(No Model.) 10 Sheets—Sheet 7.
J. T. ARMSTRONG.
CONSTRUCTION OF STATIONARY AND ITINERANT ELECTRICAL BATTERIES.
No. 380,971. Patented Apr. 10, 1888.
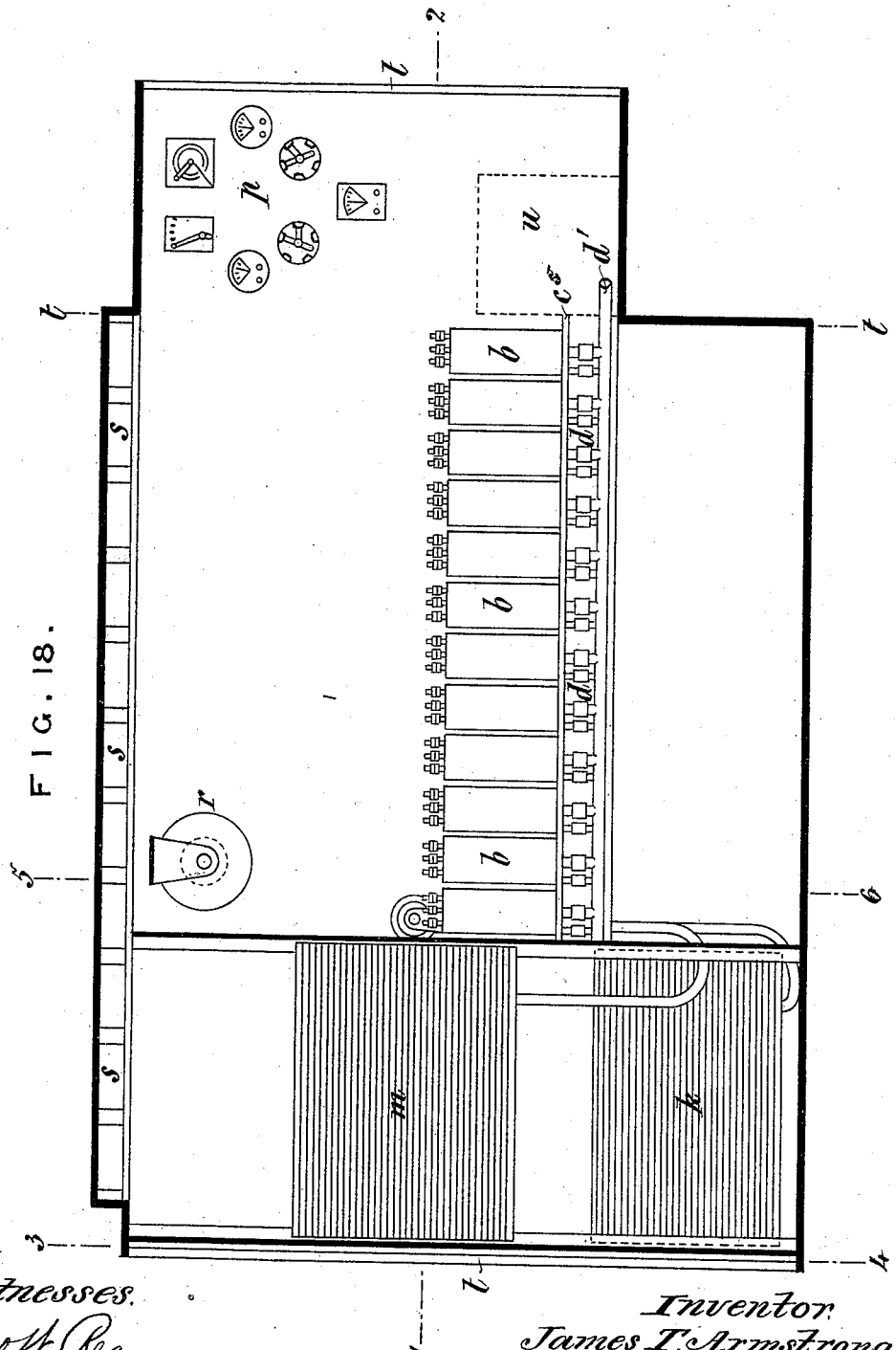

(No Model.) 10 Sheets—Sheet 8.

J. T. ARMSTRONG.
CONSTRUCTION OF STATIONARY AND ITINERANT ELECTRICAL BATTERIES.

No. 380,971. Patented Apr. 10, 1888.

Witnesses.
Geo. W. Rea.
Robert Everett.

Inventor.
James T. Armstrong.
By James L. Norris
Atty.

(No Model.) 10 Sheets—Sheet 9.
J. T. ARMSTRONG.
CONSTRUCTION OF STATIONARY AND ITINERANT ELECTRICAL BATTERIES.
No. 380,971. Patented Apr. 10, 1888.
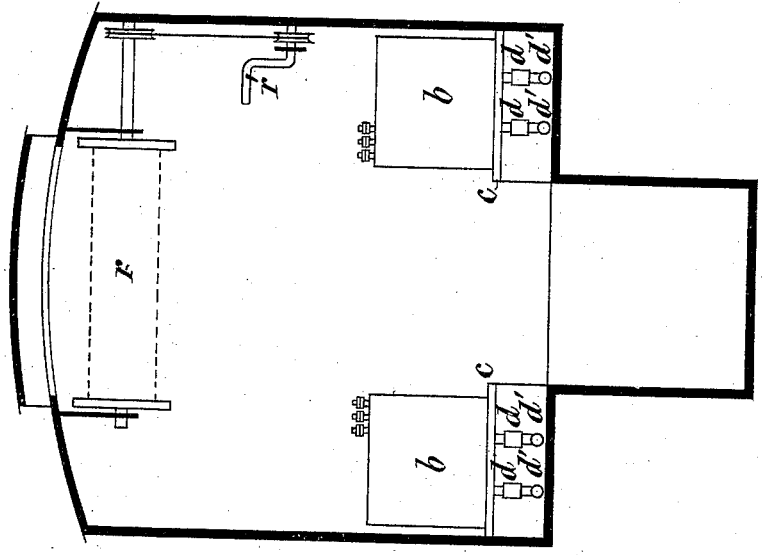
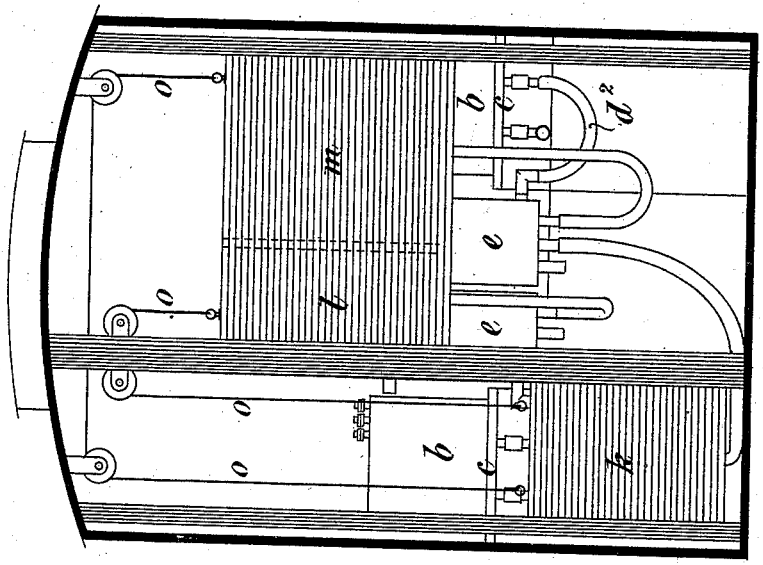

(No Model.) 10 Sheets—Sheet 10.
J. T. ARMSTRONG.
CONSTRUCTION OF STATIONARY AND ITINERANT ELECTRICAL BATTERIES.
No. 380,971. Patented Apr. 10, 1888.

UNITED STATES PATENT OFFICE.

JAMES TARBOTTON ARMSTRONG, OF LONDON, ENGLAND.

CONSTRUCTION OF STATIONARY AND ITINERANT ELECTRICAL BATTERIES.

SPECIFICATION forming part of Letters Patent No. 380,971, dated April 10, 1888.

Application filed September 1, 1887. Serial No. 248,534. (No model.) Patented in England June 30, 1886, No. 8,573.

*To all whom it may concern:*

Be it known that I, JAMES TARBOTTON ARMSTRONG, a subject of the Queen of Great Britain, residing at No. 31 Aldermanbury, in the city of London, England, analytical and consulting chemist and electrician, have invented certain new and useful Improvements in the Construction of Stationary and Itinerant Electrical Batteries, in the Methods of Working and Manipulating the Same, and in the Materials and Appliances in Connection therewith, (for which I have obtained a patent in Great Britain, No. 8,573, dated June 30, 1886,) of which the following is a specification.

The object of my invention is to effect improvements, first, in the construction of electrical batteries, &c.; second, in the elements and methods of fitting the same, &c.; third, in the methods of filling, emptying, charging, cleansing, and manipulating the same, &c.; fourth, in constructing portable apparatus for itinerating purposes, &c.; fifth, in the methods of supplying mixtures and liquids to electrical batteries, &c.

In order that my said invention may be clearly understood, reference is hereby made to the accompanying drawings, which are intended to illustrate and aid the description, but are not intended to limit the details, as such details may be very much varied.

The general construction of my invention as arranged for ordinary electric lighting, motive power, and other purposes in mansions and dwelling-houses, works, factories,&c., is shown in Figures 1, 2, and 3, Figs. 1 and 2 being front elevations, and Fig. 3 a side elevation. Fig. 4 is a side view of the outer case of a battery. Fig. 5 is an end view of the same. Fig. 6 is a top view of the outer case with the inner case inserted therein. Fig. 7 is a vertical longitudinal section of the outer and inner cells. Fig. 8 is a transverse section of the inner case or cell. Fig. 9 is a vertical longitudinal section of the inner cell. Figs. 10 and 11 are face and top views of the carbon electrodes and supporting-plate. Fig. 12 is a detail view of the zinc or metal electrode. Fig. 13 is a top view of a series of battery-cells. Figs. 14, 15, and 16 are sectional views of small glass cisterns. Fig. 17 is an elevation of a vehicle for carrying a complete battery apparatus. Fig. 18 is a longitudinal sectional elevation of Fig. 17. Fig. 19 is a horizontal section of the same on the line 1 2 of Fig. 18. Fig. 20 is a vertical transverse section on the line 3 4 of Fig. 18. Fig. 21 is a similar section on the line 5 6 of Fig. 18.

In Figs. 1, 2, and 3, $a$ $a$ are glass or other suitable insulators, the lower insulators resting on the floor and sustaining the L and T standards and guides 1 1. These standards may be extended and varied to any convenient height, and if carried to or near to the ceiling of a room the insulators $a$ $a$ are placed between the ceilings and the standards to steady the framing and also to render the insulation perfect. The sectional forms of the standards 1 1 enable them to act as guides to the cisterns $k$ and $m$ as they are raised and lowered.

2 2 are cross-pieces uniting the upper parts of the standards 1 1, and 3 3 are longitudinal supports for the lifting-gear.

4 4 4 are cross-pieces uniting the standards 1 1 and extended in front, as shown in Fig. 3. Longitudinal bars 5 5 are fitted to the bars 4, upon which bars 5 5 the batteries $b$ $b$ are placed. The cross-pieces 4 4 also serve to support the pipes $d'$.

$o$ $o$ is a pitch-chain passing over the pitch-chain wheel 6 and pulley 7 and supporting the cisterns $l$, $m$, and $k$, as shown.

8 is a worm-wheel, which is driven in either direction by the worm fitted to the shaft 11 and pulley-wheel 9, actuated by the hand rope or chain 10.

In Fig. 1 the cross-pieces 4 4 are shown in section and the bars 5 5 removed, in order to expose to view the rubber junctions $d$ $d$, leading from the batteries to the pipes $d'$.

A set of ten batteries is shown in Fig. 1; but only one of the batteries is shown in Fig. 2, the remainder being removed to render the description clear. The glass cisterns $e$ $e$, hereinafter described, are also shown in position in Fig. 1, but omitted in Figs. 2 and 3, for the same reason.

The letter $b$ designates the outer case of the battery, which receives the inner cell, $c$, and is provided with a short tube, $b'$, for filling and emptying the outer cells, $b^2$. The inner cell or frame fits into grooves $b^3$, formed in the end frames of $b$. The inner cell has grooves formed therein for receiving the porous plates $c'$ $c'$, which are so fitted as to be fluid-tight. A tube, $c^2$, is fitted to the cell $c$ for filling and emptying the same. This tube passes through the outer case, $b$, as shown in Figs. 4 and 7, and is made fluid-tight by a washer and ring, or in any other suitable manner.

Figure 22:
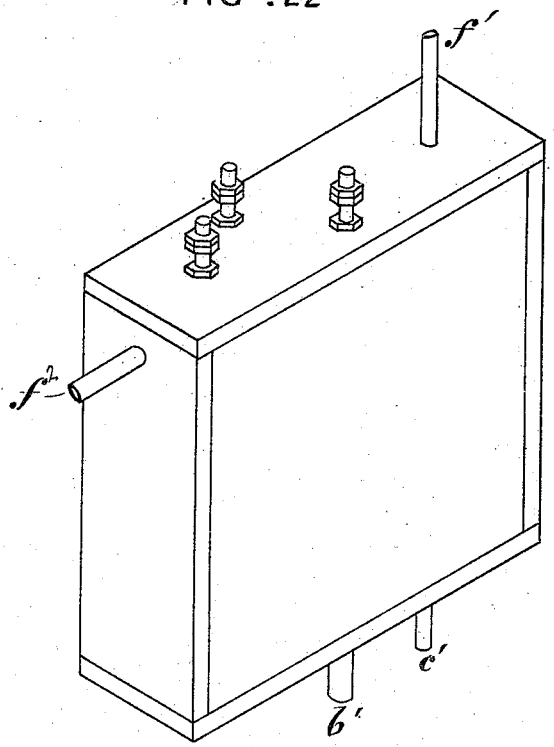

In Fig. 22 I have represented a closed battery, in which $b'$ $c'$ are the filling and emptying tubes. $f^2$ is an overflow-tube, and $f'$ is a tube provided for the escape of gases, which may be led off to the outer air. The battery is made fluid-tight. When the batteries are in position for working, the tubes $b'$ are connected by means of rubber junctions $d$ $d$ with the longitudinal tube $d'$, and in like manner the tubes $c'$ are connected with another longitudinal tube, $d^3$, as shown. A slot, $e^6$, in the top of the cellular frame $c$ is provided for the insertion of the carbons $f$. I prefer to make use of those carbons which are known as "wasters"—that is to say, such carbons as are defective and have become spoiled in the course of their manufacture, and, although unfit for use as electric-light carbons, are yet suitable to be used in my improved batteries, and which carbons are sold at a low price in consequence of their unsuitability for their primary purpose. I also sometimes use a description of carbon, which I specially prepare for the purpose, composed of a mixture of retort-carbon, manganese, and suitable binding materials.

According to one arrangement, the carbons are fitted horizontally in the frames of the batteries in the following manner: They are all cut to the horizontal length of the frame, or, preferably, the frame is made the exact length of the carbons, to prevent cutting and waste. One end of each carbon is fitted into a metallic trough and electrically connected with one of the conductors. The metallic trough is firmly secured in or on one side of the frame and perfectly insulated, so that it is quite impossible for any of the liquid or fumes to obtain access to the metal or to corrode or injure the same in any manner. The other end of each of the carbons is secured to the other side of the frame, but without metallic connections, proper means and materials being used to prevent displacement.

According to another arrangement I fix and place the carbon rods in a vertical position, as shown in Figs. 7, 10, and 11. I place the same in a metallic trough or mold so made as to be easily taken to pieces. The trough is then heated by jets of gas or other suitable means, and by the same means, and simultaneously therewith, the carbons also receive heat. A bath of molten lead or any other suitable conducting material is then formed in the trough, which material surrounds the lower ends of the carbons and a terminal. When the molten lead or other material and also the lower ends of the carbons have attained one temperature, the heat is reduced, and the whole cools simultaneously, the result being that a bar of lead or other material is formed at one end of the carbons, firmly fixing them in line and preventing their becoming loose. Before casting the lead around the ends of the carbons, as aforesaid, or before they are taken out of the frame, the other ends of the carbons farthest from the mold are fixed all together with marine glue or similar adaptable material. This unites the ends with sufficient firmness to prevent their springing, which would be inconvenient. The connection with the bar of lead is formed by means of a screw or plain bolt or stud, the head end of which is inserted in the mold previously to the casting being made through a hole of the same size as the connection in one part of the mold, the lead forming a solid mass around the same, there being then a perfect connection between it and all the carbons. The lead and the carbons to about half an inch from the lead are then thoroughly painted with a composition of pure Brunswick black and naphtha or other suitable material to prevent the same in any way being attacked by the fluids used in the battery. It will be seen that by this method of putting the carbons together they are represented as fixed, and they can then be fixed in their places, as shown in Figs. 7, 10, and 11; but in some cases I use them separate and distinct in themselves, so that they may be capable of being taken out of the battery for examination and again replaced, or in any other suitable manner. When the zinc or other metallic plates (whether simple or alloyed) are being cast, a screw, bolt, or stud is, in like manner as aforesaid, inserted in the upper end of the mold made for casting the zinc or alloy, whereby the same becomes embedded in the flanged end of the molten metal, and, when cast, the connection is perfect. In using such plates I find it advantageous to coat one side of the plate (that is the side which is not opposite to the carbons) and also the flange with the before-mentioned composition of Brunswick black and naphtha, or any other suitable coating in substitution thereof or in addition thereto, in order to insulate such parts and prevent the action of the exciting-fluids thereupon and to economize the consumption of the same and prevent waste. The plates and flanges are usually made as shown in perspective in Fig. 12, and inserted in the spaces $b^2$ $b^2$.

One of the small glass cisterns $e$ $e$ is shown enlarged in Figs. 14, 15, and 16, in which figures $e'$ $e'$ is the body of the cistern. $f^5$ is an overflow-pipe placed in such a position that no liquor can rise above a certain height in the batteries. $d^2$ is the pipe which is connected with the pipe $d'$, leading to the batteries on one side, and $d^3$, leading to the batteries on the other side and from the fellow cistern on the opposite side. $g$ $g$ $g$ are three plugs, which may be raised by the cams $h'$, fitted to the axle $h$. The cams $h'$ are by preference triangular cams, as is clearly shown in Figs. 14 and 15, and are so formed and arranged that only one plug can be opened at a time. $h^3$ is a hand-wheel for lifting the plugs $g$ $g$ $g$. The pipes $i$ $i$ $i$ of the two cisterns *e e* may be connected by flexible or other pipes with the cisterns *k l m*, as shown in Figs. 19 and 20.

When it is desired to charge the batteries, the double cistern *l m* is raised, the cistern *k* being lowered at the same time by the same means, as shown in Fig. 2. This operation causes the liquids in the cisterns *l m* to enter the cisterns *e e*, and the liquid previously in the cisterns *e e* at the same time flows back into the cistern *k*; or if water has been added to the batteries these are emptied before charging from cisterns *l* and *m*. The cisterns *e e* are placed so that their upper ends are level with the tops of the batteries *b b*, or at such a height that the overflow-pipe *f* shall come into operation at the proper time. When the double cistern *l m* has been so raised and the cisterns *e e* filled, the liquids may be run into any or all of the batteries by raising the plugs *g g*, as required; or the filling can be regulated according to the height the cisterns are raised.

One example of charging the cistern is as follows: The cistern *m* may be charged with an exciting-fluid—say a small quantity of acid or salt and water or any other suitable mixture or material. The cistern *l* may be charged with ordinary acid or special exciting mixture, to which I have applied the term "electronite," or any other suitable material. The cistern *k* may be charged with a mixture of water and sulphuric acid, which mixture is usually capable of cleansing the zinc in a few seconds; but this is only mentioned as an example.

When the cistern *k* has been lowered and has received its fluid back from the batteries after cleansing the zinc, crystals and deposits are gradually formed in such cistern while at rest, which materials deposit themselves therein, and such materials usually consist of substances useful in commerce and possessing marketable value, the process being automatic and inexpensive and tending not only to put the battery in a better working condition, but also to recoup the expense incurred in producing the electric current from the batteries; but the main object is to cleanse the plates used and to make them more effective.

In order to reduce the power of the batteries, the double cistern *l m* may be lowered and some of the liquids run back, so as to reduce the surface of the electrodes operated upon by the excitants.

When it is desired to cleanse the batteries, the double cistern *l m* is lowered to the position shown in Fig. 1, or thereabout, the liquids being allowed to run out of the batteries into the cistern *l m*. The liquid in the cleansing-cistern *k* is then allowed to run into the batteries, for the purpose of cleansing the same. This may be again drawn off as before, and the batteries may be kept empty until again required.

In connection with the tanks or cisterns *k l m*, when and where convenient and necessary, I make use of fixed cisterns for supplying the movable cisterns.

In Fig. 13 the method of coupling up the batteries is shown. 11 11 are the junctions to the carbons, and 12 12 the junctions to the zinc or other metallic plates. Instead of using two zinc plates or equivalent plates or bars of other materials, I sometimes substitute for one of such plates another metal—such as iron—or I use two different kinds of metal instead of using similar metals in both compartments, and thereby obtain equal or greater electrical power with reduced cost. In carrying out this part of my invention I make use of different kinds of metals and metallic alloys or laminated plates of dissimilar metals rolled, cast, or otherwise manufactured into plates or bars.

In forming ordinary zinc plates I add a small amount of alloy, such as silver, tin, or lead.

The choice of the metals forming the plates, as well as the selection of the alloy to be added to the metal under treatment, depend upon the chemical affinities of the metals relatively to each other and to their powers of resistance and behavior when exposed to the action of the exciting-liquids.

It will be understood that I do not confine myself to any particular kind of metals, or of metals and alloys, as these may be very much varied; but I prefer those which are cheap, continuous in action, and which I can in many cases obtain as waste or by-products.

It is well known that electrical batteries with clean electrodes are more effective than those which are corroded or otherwise impaired, and that when the batteries have been at work continuously for a length of time the electrodes become corroded or coated with deleterious compounds, which greatly interfere with their working and lessen the electric current obtainable therefrom, and also that the sediment which deposits itself in batteries at work or that have been at work for some time is detrimental to their efficiency and effectiveness. In order to remove or remedy such defects, and thus improve the normal working and continuity, and to render the same more constant than hitherto has been practicable, and also to make use of certain mixtures in lieu of and connected with the ordinary exciting-liquids for the cells in which the zinc or equivalent elements in electrical batteries are placed, I make use of various mixtures of fluids with fluids and of fluids and other substances mixed therewith, and periodically exchange such mixtures for others which act upon the electrodes, so as to remove or counteract the objectionable effect of previous mixture or mixtures upon such electrodes. Thus one particular exciting or cleansing mixture or exciting and cleansing mixture may be used for a certain time. Then this mixture is withdrawn from the battery and another inserted, which will neutralize the effect of the previous mixture upon the electrodes and remove the deposit, corrosive material, or other obstruction to the proper working of the battery and restore the electrodes to a great extent to their initial effectiveness, for which purpose I use two or more cisterns, as hereinbefore described, charged with the necessary fluids or mixtures, and connect and disconnect, raise, and lower the same in order to fill, empty, cleanse, and otherwise manipulate the batteries.

In order to effectually cleanse the battery or batteries from time to time, I provide the cleansing-cistern $k$ with a solution of selected chemical ingredients, the character of which is varied according to the nature of the deposit to be removed or cleansed from the cells and plates, and which cistern is placed in communication with the cells of the batteries by means of flexible tubes and other arrangements, as hereinbefore described, or by other suitable means that would readily suggest itself to those skilled in the use of batteries.

By judiciously selecting the various ingredients in accordance with the laws of chemical affinities and combinations I am enabled to obtain materials possessing marketable value.

In forming plates for batteries I sometimes make use of tinned iron scraps by consolidating the same by pressure, heat, or any other suitable means or process. By the use of these plates I am enabled to dissolve the tin and to recover the same from the resultant liquid in a metallic state, which tin, as well as the remaining iron, may then be sold at a profit. Tinned iron scraps or refuse can easily be formed into plates which will bear transportation or handling by piling the scrap-tin and subjecting it to pressure applied by any suitable and well-known means, so as to press the scraps together without forming a solid block, thereby forming a cellular plate, from which plate the tin becomes separated in the cell and can be recovered, the plate acting as one of the elements. A similar method of forming plates may be adopted with many other kinds of metallic refuse, the separation of the primary elements or materials of which assist or cause the generation of electricity, and this part of my invention includes the utilization of many kinds of waste materials and the making up of the same into one of the elements of a battery, and thereby recovering the resultant metal or metals in such a state that its value is greatly enhanced, and by this new process it is cheaply and effectively carried out.

In the manufacture of porous plates I sometimes make use of the refuse of blast and other furnaces arising from the melting of metals and other industrial operations, such refuse being variously known as "dandies," "slag," "silicate," "scoria," and otherwise, and which possesses little or no value commercially. Of these, or some one or more of these or analogous materials, I form such porous plates, and utilize the same in electrical batteries as substitutes for the ordinary and more expensive porous plates. Slag which becomes porous when cold is selected, and the plates formed thereof are either cut out of the block of slag or else the slag is melted and then cast in any suitable mold into the plates.

In supplying liquids and mixtures to electrical batteries I sometimes make use of certain cheap and effective mixtures in lieu of the ordinary exciting-liquids for the cells in which the zinc or equivalent elements are immersed in electrical batteries, for which purpose I insert in such cells saponified or partly saponified oils or fats, either separately or combined. In some cases I use the cheaper kinds of oils and fats and refuse oils from gas-works saponified or partly saponified, or mixed with acid, which during such use become bleached or purified, and are thereby rendered more valuable than their original cost.

The mode of using oils and fats in batteries just described forms no part of the present invention, since it is already embodied and claimed in an application for United States patent filed by me the 23d day of February, 1886, Serial No. 192,913.

I also construct vehicles for conveying batteries and the materials for use therein to distant places for temporary use, such as the lighting of gardens for garden-parties, electrical displays in halls, ball-rooms, exhibitions, and other places, the loading or unloading of ships, and all other work required at nighttime, providing the electric light where accidents have occurred, and also either in combination with or without the electrical motive power for mining, building, excavating, crushing, and leveling roads and lands, surface and submarine boats, and agricultural and diving operations, drainage and tunneling, and all other situations and requirements underneath or upon or above the surface of the ground in which electrical lighting and electrical motive power or either of them may be useful. This apparatus or vehicle, with its batteries or other appliances, is hereinafter sometimes referred to as "the itinerant." In carrying out this part of my invention I make use of vehicles moved on rollers, tricycles, barrows, trucks, carts, vans, wagons, and all other road, mining, agricultural, tramway, and railway vehicles, and fit the same with electrical batteries in such a manner that the same may be safely used for public and private conveyances or transported to any locality where they may be required by man, horse, or steam power, or by the application of electrical motors actuated by the currents obtained in or directly from the electrical batteries contained in such vehicles. The vehicles may be specially built and fitted for the class of battery and motors which they are intended to convey, or by which they are to be propelled, or so as to constitute a receptacle for the batteries and their appliances while in use; or vehicles not so built may be specially altered, prepared, and fitted therefor with all the necessary connections, switches, unions, conducting-wires, batteries, (such as those herein described, or ordinary forms of batteries,) terminals, tanks, motors, incandescent and other lamps and elements, acids, alkalies, and other appliances, materials, and fluids for effecting the object of this part of my invention.

In fitting vehicles for the purposes aforesaid I prefer to make the bottom of the vehicle, or a portion thereof, low down near to the ground, in order to provide for the raising and lowering of the cisterns or tanks, as hereinbefore described. Figs. 17 to 21 are intended to illustrate this part of my invention by showing one method of carrying out the same.

Referring to Figs. 18, 19, 20, and 21, $b$ $b$ are the batteries, placed upon shelves $c^5$ $c^5$ on each side of the vehicle. $d$ $d$ are the filling and emptying tubes, each connected with the respective batteries and united by means of rubber junctions with the longitudinal tubes $d'$ $d'$. $e$ $e$ are the two glass cisterns, as described in Figs. 14, 15, and 16. When using two of these cisterns, as shown in Fig. 19, the pipes $i$ $i$ $i$, Figs. 14, 15, and 16, may be connected by flexible or other pipes with the cisterns $k$ $l$ $m$, $k$ being the cleansing-cistern, and the double cistern $l$ $m$ being used for supplying the exciting fluids and mixtures to the batteries, as hereinbefore described with respect to Figs. 1, 2, and 3, the cisterns being mounted, guided, and worked in a similar manner and suspended by cords or chains $o$ $o$. The overflow-pipe $f$ to the cisterns $e$ $e$ prevents the possibility of overfilling the batteries, and the quantity of fluids in the batteries can be regulated to any height, as they always coincide with the height seen in the glass cisterns $e$ $e$. By shutting off the fluids as required the batteries may be used in sets of one, two, or more for supplying less or more electric force. The switch-board arrangements are fitted at $p$, Fig. 18. $r$ is a reel or drum for holding the coil of connecting insulated wire for carrying the electricity to any required distance. $r'$ is a winch and pulley for winding in the wire when not in use. The vehicle may be fitted with doors at $t$ $t$ and ventilators at $s$ $s$; also, a movable or other seat may be fitted at $u$, which may be converted into a sleeping-bunk for the attendant.

Referring to Fig. 17, $v$ is a pitch-chain wheel attached to a suitable axle, which may be driven by an electrical motor geared thereto and actuated by electric currents derived from the batteries. $w$ is a pitch-chain hoop fitted to the large wheel of the itinerant, to which hoop the wheel $v$ is geared. One or both of the hind wheels may be thus fitted for driving the itinerant by electric power.

I sometimes use the "itinerants" in lieu of fixed primary batteries or other fixed means of generating electricity for charging and manipulating secondary batteries when placed in one or more houses, or a block of buildings, or any other place for the purposes of lighting or motive power, or either of them. When it is desirable to reduce the weight of the apparatus carried by a vehicle which is to be moved by and to work the motive power for any purpose, I effect such reduction of weight by placing the charging and cleansing cisterns, with these lowering and raising appliances, at or on premises adjacent to the works to be carried on, or, in the case of traveling or itinerant vehicles, at their ordinary depots or at certain convenient stations or places on the route, instead of fitting them to the vehicles themselves, at which stations such vehicles can conveniently make short stoppages for the purpose of being charged, cleansed, and otherwise manipulated, as may be necessary or desirable. In connection with this method of working I sometimes find it advantageous to cleanse the batteries by connecting the same with suitable hydrants or other sources of water-supply, and thereby thoroughly wash out the same with water without delay, and thus prepare the batteries for a fresh charge of exciting-fluids, which may be immediately supplied thereto from the stationary cisterns.

In connection with the several arrangements hereinbefore described, I sometimes provide fixed or movable boxes or cases fitted with cellular divisions suitable for holding measured portions of ingredients for charging the batteries for certain periods of time. Thus each cell or compartment may contain sufficient materials for daily or other periodical use, or for, say, five hours' consumption, one packet being labeled "Monday," and intended for that day's consumption, the next cell being similarly fitted and labeled "Tuesday," and so on for a week or other definite period, the intention being that the attendants will always be able to ascertain at a glance whether they have periodically supplied the cisterns, and through them the batteries, with the required quantities of materials for sustaining the electrical force with due regularity. For this purpose compressed materials—such as my "electronite"—may be used, suitable for packing and storage. These cases so fitted are also intended to be left in places supplied with the electric light or power where they are not required to be attached to any vehicle or itinerant, or they may be fixed in the vehicle and used therewith.

I claim—

1. In an electrical-battery apparatus, the combination of the battery cells or cups, the electrolyte supply-tubes connected therewith, the vertically-movable supply and discharge receiving cisterns connected with the tubes leading to the cells and operating to rise and fall alternately, whereby the liquid will discharge from the cells into one cistern when the latter is lowered and flow from the other into the cells while the supply-cistern is raised, substantially as described, and a stationary feeding-cylinder, substantially as and for the purposes set forth.

2. A galvanic battery comprising a closed outer trough or box having grooved end walls, the movable inner frame having a slot in its top, the carbon electrodes fitted into said slot, and the porous plates and the metal electrodes placed in the outer trough on each side of the inner frame, substantially as herein set forth.

3. A galvanic-battery electrode or element formed of tinned scrap-iron molded or pressed into the desired shape, substantially as herein set forth.

4. The within process of forming a galvanic-battery electrode or element from waste metals and mixtures and amalgamations of such waste metals, consisting in piling the metal and subjecting it to pressure to press the particles together without forming a solid block to form a cellular plate, and then suspending said plate in the liquid in the battery-cell to dissolve and separate parts of the metal from the portion to form the electrode, substantially as described.

5. In a galvanic battery, a porous plate formed of refuse material or slag from blast or other furnaces, substantially as herein set forth.

6. A perambulating or itinerating electrical apparatus comprising a car or wagon having a depressed center forming a passage-way, the battery-cells arranged at the sides of said passage-way, and the movable supply and stationary feeding-cisterns arranged at one end of the car, substantially as herein set forth.

Dated August 19, 1887.

JAMES TARBOTTON ARMSTRONG.

Witnesses:
O. G. BEARD,
8 *Quality Court, London, W. C.*
L. V. BRINDLEY,
28 *Southampton Buildings, Chancery Lane, W. C.*